Figure 1:
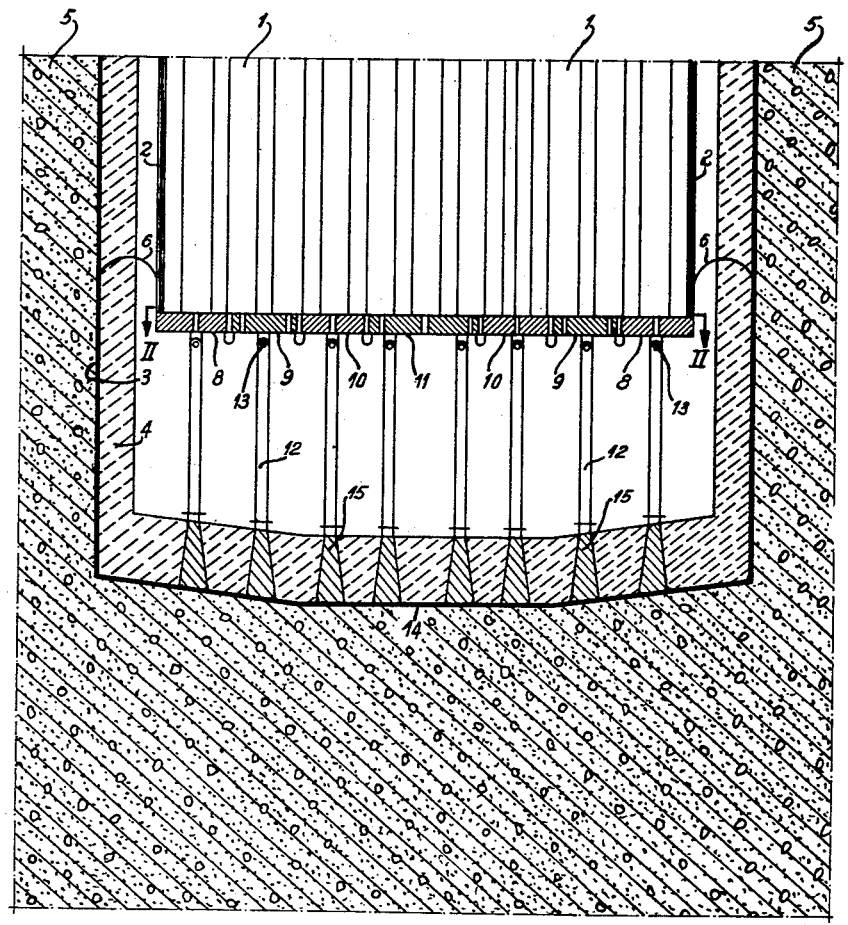

March 23, 1965 P. ROUGÉ 3,174,906
SUPPORT STRUCTURE FOR VERTICALLY-STACKED SOLID
MODERATOR RODS OF A NUCLEAR REACTOR
Filed March 22, 1962 5 Sheets-Sheet 4

United States Patent Office 3,174,906
Patented Mar. 23, 1965

3,174,906
SUPPORT STRUCTURE FOR VERTICALLY-STACKED SOLID MODERATOR RODS OF A NUCLEAR REACTOR
Pierre Rougé, Gif-sur-Yvette, France, assignor to Commissariat à l'Energie Atomique, Paris, France
Filed Mar. 22, 1962, Ser. No. 181,756
Claims priority, application France, Apr. 14, 1961, 858,749
6 Claims. (Cl. 176—41)

The present invention relates to a supporting structure for vertically-stacked moderator rods of a nuclear reactor.

It is known that in atomic piles the joint influence of the increase in temperature and phenomena known as "Wigner effect" causes local deformations of the moderator rods which may not only impair the continuity of the longitudinal channels provided in the centre of the rods but may also affect the very stability of the assembly. It is, however, possible to overcome, to a large extent at least, the aforementioned drawbacks by, for example, constructing the stack with adjacent vertical rods which are connected to one another by longitudinal pins engaging in radial slots located in the lateral faces of the superposed prismatic bars constituting these rods, and such an arrangement has in fact been described and illustrated in the specification of French Patent No. 1,214,246.

By this means it is, in fact, possible to effect a relative displacement in the vertical direction of each rod in relation to those surrounding it and also to effect a transverse expansion of the rods as a result of the tolerances provided in the base of the pinning slots, on the condition, however, that the stack rests on a supporting structure which is perfectly flat and retains its horizontal disposition during operation of the reactor. Although it may be possible, to this end, to seat one block, reinforced by means of tubes or the like forming ties and the edge of which rests on the housing or hermetic enclosure surrounding the reactor, the same does not apply when the power provided requires much greater diametral dimensions of the reactor, for example approximately 20 metres. The lengths of overhang become such that it is no longer possible to retain the desired tolerances for the horizontal disposition of the assembly.

The present invention has for an object to remedy this drawback by means of a simple device which also enables a better distribution of the stack load on the base of the reactor to be obtained.

Accordingly, the invention consists in a support structure for vertically-stacked solid moderator rods of a nuclear reactor, comprising a series of rigid, independent, concentric and co-adjacently arranged supporting rings.

The supporting rings may be connected to one another by pins arranged in radial slots in such a way that slight relative movement or deformation of the rings may occur, the connection being completed on the inner faces of the rings by means of a flexible junction of the hermetic bellows kind.

Each supporting strut may comprise, at its end connected to a ring, a joint perpendicular to the plane containing the axis of the stack and the axis of the strut in order to ensure the individual lateral rigidity of each ring. The other end of each strut may rest on the base of the reactor housing by means of heat insulated swivel-joints in order to avoid transmission of the supporting surface heat to the housing. Moreover, they are preferably located straight above or below the reactor channels.

Figure 2:
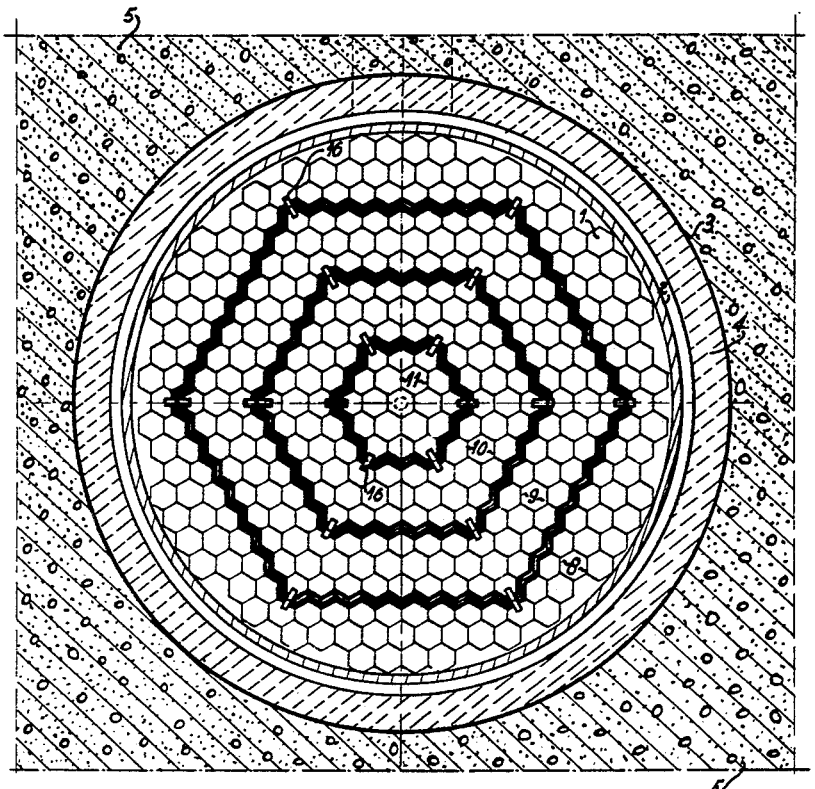
Figure 4:
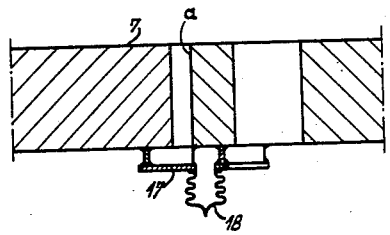
Figure 3:
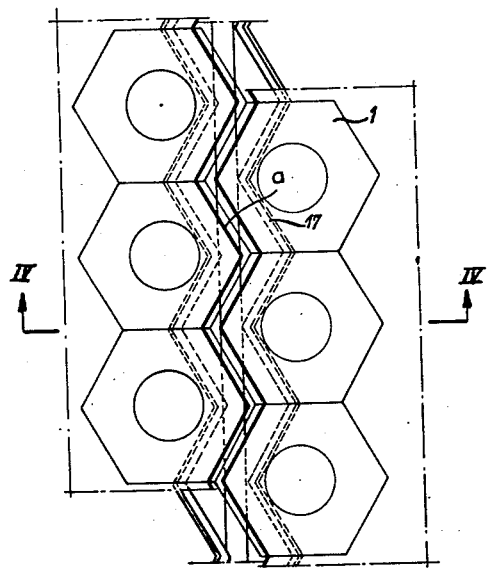
Figure 5:
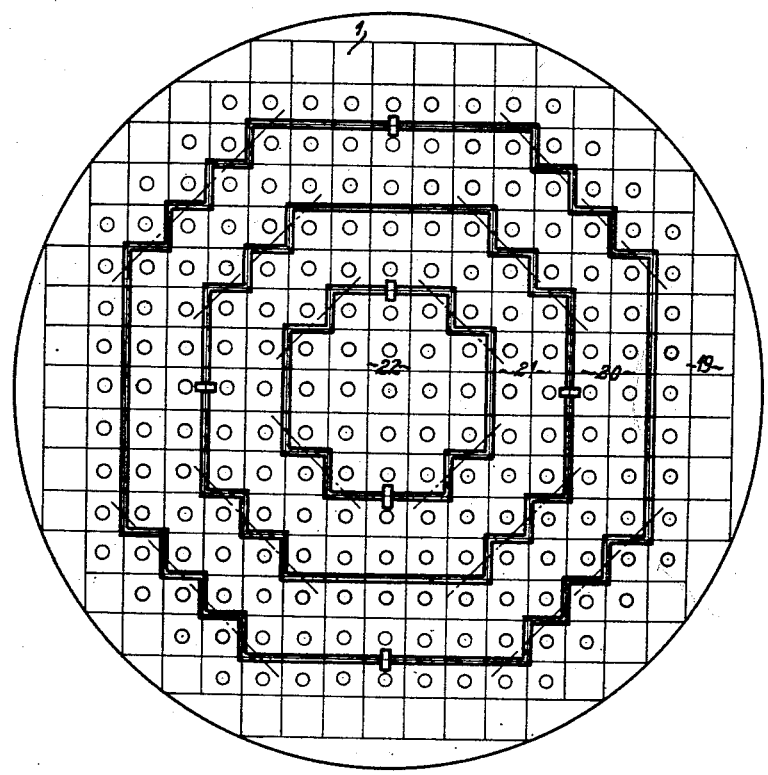
Figure 7:
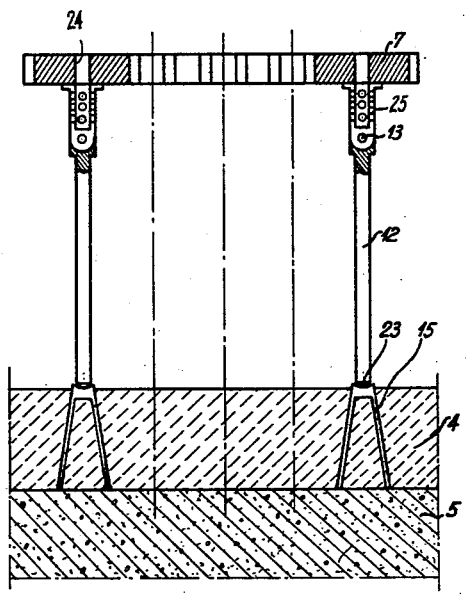
Figure 6:
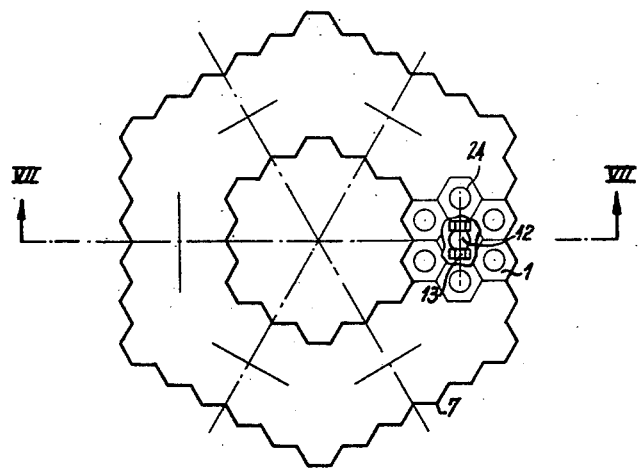

In order that the invention may be more clearly understood, reference will now be made to the accompanying drawings which show certain embodiments thereof by way of example, and in which:

FIGURE 1 shows a vertical section, diagrammatically representing the lower part of a nuclear reactor in which the stack rests on a support structure in accordance with a first embodiment of the invention, FIGURE 2 shows a horizontal section along the line II—II of FIGURE 1, FIGURE 3 shows another view, more clearly illustrating the method of joining together the two supporting rings of the support structure, FIGURE 4 shows a section along the line IV—IV of FIGURE 3, FIGURE 5 shows a horizontal section of a further embodiment according to the invention, FIGURE 6 shows a detailed view to a larger scale, illustrating the type of joint of a supporting strut for a part of the support structure shown in FIGURE 1, and FIGURE 7 shows a view along the line VII—VII of FIGURE 6.

Referring to the drawings, FIGURE 1 shows the lower part of a nuclear reactor using a solid moderator. The stack comprises vertically arranged co-adjacent graphite rods 1, each rod being constituted by superposing prismatic bars, the section of which is, for example, a regular hexagon. Central longitudinal channels provided at the centre of the bars in order to contain cartridges of fissile material are consequently distributed in a regular network having a triangular mesh, and the rods are interconnected, as referred to above, by radial and longitudinal pins. Moreover, the stack is kept rigid from the outside by means of a cylindrical metallic jacket 2. The assembly is located in an enclosure 3, generally referred to as a "drum," and which is sealed against the cooling liquid circulating in the reactor. The inside of the enclosure is provided with a layer 4 of heat-insulating material and is surrounded by a housing 5, in concrete for example, which ensures protection against the radiation given off by the active part of the reactor. A thin metal sheet 6 provides a flexible and hermetic seal or joint between the jacket 2 and the enclosure 3.

In accordance with the invention, the moderator rods are supported on a support 7 constituted by an assembly of concentric supporting rings such as 8, 9, 10 and 11, arranged adjacent to one another, although a slight radial tolerance may be permitted between two successive rings. Each ring is supported by a plurality of struts 12, symmetrically arranged around the axis of the stack, the number of these struts varying according to the respective dimensions of the various rings and the loads they are to carry. Each strut is articulated at 13 close to its end which is connected to a ring of the support surface and its other end rests rigidly on the base 14 of the hermetic enclosure 3 by means of metal clips 15.

FIGURE 2 shows a horizontal section of the reactor shown in FIGURE 1, and illustrates in greater detail the particular shape of the rings supporting the stack. As a result of the regular arrangement of the moderator rods, these in turn have a composite outer shape which is generally hexagonal; the sides of the outer hexagon are thus of saw-tooth shape exactly fitting the outline of the prismatic bars forming the rods. The supporting rings are connected to one another by a series of pins 16, preferably located through the angles of the outer hexagonal shapes. These pins engage in radial slots provided in the supporting rings, in such a way as to enable the latter to effect slight movements in relation to one another while avoiding any angular staggering between adjacent rings. With this arrangement it is thus possible homogenously to distribute the load independently on each ring, the yielding moment of each remaining unaltered whatever the deformations which may occur during operation of the reactor. The hermetic seal between two adjacent rings is effected by means of connecting flanges 17 (FIGURES 3 and 4) allowing them to be joined along the broken line shown. A hermetic bellows 18 is welded onto each of these flanges which facilitates the vertical displacement resulting from differential expansion and eliminates leakage of the cooling liquid through the possible gaps which may have been provided between the rings during assembly.

FIGURE 5 shows a modification in which the network spacing into which the moderator rods are arranged, is not triangular but square. The supporting structure for the stack is also constituted by concentric support rings having a polygonal outline, such as 19, 20, 21 and 22.

In accordance with the invention, the articulated end 13 supporting the rings should be such that it ensures cohesion of the support structure while allowing its various parts to expand. To this end, the articulation axes of the struts are orientated in a direction perpendicular to the plane including the axis of the stack and that of the strut in question, i.e. perpendicular to the radius of the supporting ring passing through the point of intersection with the strut (FIGURE 6). In the particular case of the hermetic enclosure 3 being replaced by a drum of prestressed concrete, it is necessary to heat-insulate the latter in order to prevent it undergoing too high a temperature rise. When the reactor is in operation, the lower ends of the struts 12 rest on swivel joints 23, which are heat-insulated up to the height of the heat insulation 4 so as to prevent the transfer of heat from the supporting structure to the housing (FIGURE 7).

It is preferable that the struts be placed above or below the channels provided for the control rods of the reactor or else above or below a fuel channel such as 24; in this case they are tubular in shape and perforated by a series of radial holes such as 25 to allow the cooling liquids for the cartridges of fissile material to pass through.

In another embodiment, the aforementioned articulated struts may be replaced by rigid struts, connected to the reactor housing and supporting the concentric supporting rings by means of rollers, the axes of which are perpendicular to the radius of the rings in the horizontal plane, in order also to ensure the lateral stability of the support structure.

It will be apparent that the invention has been described only by way of example and that various modifications may be made to the specific details set forth, without in any way departing from its scope. In particular it applies not only to the type of stacking described, but also to other embodiments wherein the moderator rods are independent of one another and capable of undergoing slight vertical movement.

What I claim is:

1. In a nuclear reactor, a reactor housing, a support structure comprising a central element and a series of rigid, independent, concentric, and co-adjacently arranged supporting rings surrounding said central element, solid moderator rods vertically stacked upon said support structure and struts symmetrically arranged around the axis of the stacks in planes passing through said axis, each of said struts at one end bearing on the base of said reactor housing and at the other end being articularly connected to a respective one of said rings and said central element.

2. Apparatus as described in claim 1, wherein the axis of said articular connections is perpendicular to the plane containing the axis of the stack and the axis of the strut in such a way as to ensure the lateral rigidity of the supporting ring assembly.

3. Apparatus as described in claim 1 wherein said supporting rings are connected by pins engaging in radial slots provided in said rings whereby adjacent rings may move and deform slightly relatively to each other.

4. Apparatus as described in claim 1 wherein the struts are heat-insulated from said housing.

5. Apparatus as described in claim 1 wherein a flexible hermetic joint connects the adjacent edges of any two of said supporting rings and is mounted on the inner faces of said rings.

6. Apparatus as described in claim 5 wherein said hermetic joint is a metal bellows.

References Cited by the Examiner

UNITED STATES PATENTS

| 2,852,457 | 9/58 | Long et al. | 176—84 |
| 3,034,976 | 5/62 | Fortescue et al. | 176—59 |
| 3,034,977 | 5/62 | Holl et al. | 176—83 |
| 3,061,532 | 10/62 | Roche et al. | 176—84 |

FOREIGN PATENTS

| 1,214,246 | 11/59 | France. |
| 1,250,669 | 12/60 | France. |
| 852,839 | 11/60 | Great Britain. |
| 859,369 | 1/61 | Great Britain. |

OTHER REFERENCES

Amorosi et al.: Proceedings of the Second United Nations International Conference on the Peaceful Uses of Atomic Energy, vol. 9, 1958, pp. 373–375.

CARL D. QUARFORTH, *Primary Examiner.*